US008226878B2

(12) United States Patent
Huo et al.

(10) Patent No.: US 8,226,878 B2
(45) Date of Patent: Jul. 24, 2012

(54) LASER PROCESSING OF METAL NANOPARTICLE/POLYMER COMPOSITES

(75) Inventors: Qun Huo, Orlando, FL (US); Hui Chen, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 888 days.

(21) Appl. No.: 11/774,796

(22) Filed: Jul. 9, 2007

(65) Prior Publication Data

US 2008/0213542 A1 Sep. 4, 2008

Related U.S. Application Data

(60) Provisional application No. 60/819,071, filed on Jul. 7, 2006.

(51) Int. Cl.
| *B29C 35/08* | (2006.01) |
| *H05B 6/00* | (2006.01) |
| *B05D 3/06* | (2006.01) |
| *B05D 3/00* | (2006.01) |
| *B29C 65/00* | (2006.01) |
| *B23K 26/00* | (2006.01) |

(52) U.S. Cl. ........ 264/400; 264/405; 264/482; 427/554; 427/596; 427/597; 156/272.8; 522/2; 219/121.6; 219/121.61; 219/121.64; 219/121.67; 219/121.69; 219/121.7; 219/121.71

(58) Field of Classification Search ............... 264/400, 264/482, 488, 494, 405; 156/272.8; 427/554, 427/596, 597; 522/2; 219/121.6, 121.61, 219/121.64, 121.67, 121.69, 121.7, 121.71
See application file for complete search history.

(56) References Cited

U.S. PATENT DOCUMENTS

| 4,092,518 | A | * | 5/1978 | Merard | 219/121.69 |
| 5,206,496 | A | * | 4/1993 | Clement et al. | 250/271 |
| 5,313,193 | A |   | 5/1994 | Dubois et al. | |
| 5,575,936 | A | * | 11/1996 | Goldfarb | 219/121.68 |
| 5,604,635 | A | * | 2/1997 | Lawandy | 359/620 |
| 5,637,244 | A | * | 6/1997 | Erokhin | 219/121.69 |
| 5,886,318 | A | * | 3/1999 | Vasiliev et al. | 219/121.69 |
| 6,333,486 | B1 | * | 12/2001 | Troitski | 219/121.69 |
| 6,537,479 | B1 | * | 3/2003 | Colea | 264/400 |
| 6,768,081 | B2 |   | 7/2004 | Troitski | |
| 2003/0093092 | A1 | * | 5/2003 | West et al. | 606/139 |
| 2003/0165680 | A1 | * | 9/2003 | Brady et al. | 428/402 |
| 2003/0224162 | A1 | * | 12/2003 | Hirai et al. | 428/402 |

FOREIGN PATENT DOCUMENTS

WO    WO 2004113436 A1 * 12/2004

OTHER PUBLICATIONS

Qiu et al. Space-selective precipitation of metal nanoparticles inside glasses. Applied Physics Letters. vol. 81, No. 16. pp. 3040-3042. 2002 American Institute of Physics. Oct. 14, 2002.*

(Continued)

*Primary Examiner* — Christina Johnson
*Assistant Examiner* — Atul P Khare
(74) *Attorney, Agent, or Firm* — Jetter & Associates, P.A.

(57) ABSTRACT

A method of forming articles having closed microchannels includes the steps of providing a substrate including a composite material, the composite having metal nanoparticles dispersed in a polymer matrix. The substrate is irradiated with a laser beam at an intensity and time sufficient to selectively remove the polymer below a surface of said substrate to form at least one microchannel, wherein the intensity and time is low enough to avoid removing the polymer above the microchannel, wherein an article having at least one closed microchannel is formed. A metal nanoparticle/polymer composite composition can have functionality that can undergo addition reactions to seal or join pieces of polymers or composites upon irradiation of the composition placed on one or more pieces.

10 Claims, 4 Drawing Sheets

OTHER PUBLICATIONS

Giridhar et al. Femtosecond pulsed laser micromachining of glass substrates with application to microfluidic devices. Applied Optics. vol. 43, No. 23. pp. 4584-4589. Aug. 10, 2004.*

Jianrong Qiu, et al. "Space-selective Valence State Manipulation of Transition Metal Ions Inside Glasses by a Femtosecond Laser", Applied Physics Letters, vol. 79, No. 22, pp. 3567-3569, Nov. 26, 2001.

* cited by examiner

LASER PROCESSING OF METAL NANOPARTICLE/POLYMER COMPOSITES

CROSS-REFERENCE TO RELATED APPLICATIONS

The present application incorporates by reference in its entirety and claims priority to U.S. Provisional Patent Application Ser. No. 60/819,071 filed Jul. 7, 2006, entitled "Laser Processing of Metal Nanoparticle/Polymer Composites".

STATEMENT REGARDING FEDERALLY SPONSORED RESEARCH OR DEVELOPMENT

The U.S. Government may have certain rights to the invention based on National Science Foundation Career Award DMR 0239424 and 0552295, and NIRT award DMI 0506531.

FIELD OF THE INVENTION

The present invention is related to methods of forming articles having closed microchannels from composite substrates using laser processing and resulting articles including articles having closed microchannels.

BACKGROUND OF THE INVENTION

Laser ablation polymeric materials are receiving increasing attention as substrates for microfluidic devices. Polymers possess a range of chemical, physical, and surface properties that allow great flexibility in matching materials to specific device applications. The cost of polymer substrates also can be significantly less than that of glass or silicon. In addition, fabrication of microchannels in polymer substrates is relatively simple and a greater variety of channel geometries, including complex 3-D systems, can be achieved in comparison to glass and silicon substrates.

There are many techniques employed for the fabrication of microchannels in polymer substrates including imprinting, etching, casting, and injection molding. While these methods are easily implemented, they require fabrication of a template, mask, or mold, otherwise known as a master. The creation of a master is time-consuming and adds an additional step to the microchannel fabrication process. Moreover, minor modifications to the design of a microchannel device require the fabrication of a completely new master.

To circumvent these problems, laser ablation of polymer substrates has been investigated as a method for forming microchannels for rapid proto-typing of different microfluidic geometries. Another potential feature of laser ablation is the capability of surface modification of channel walls concurrent with microchannel formation. However, conventional laser ablation is limited in the sense that it is incapable of forming closed microchannels, being only able to realize open channels and cavities.

SUMMARY OF THE INVENTION

A method of forming articles having closed microchannels includes the steps of providing a substrate including a composite, the composite having metal nanoparticles dispersed in a polymer matrix. The substrate is irradiated with a laser beam at an intensity and time sufficient to selectively remove the polymer below a surface of said substrate to form at least one microchannel, wherein the intensity and time is low enough to avoid removing the polymer above the microchannel, wherein an article having at least one closed microchannel is formed. The composite can be formed by dissolving a polymer in a solvent to form a solution, adding metal nanoparticles to the solution, and drying the solution to form the composite. The substrate and resulting article can be film. A preferred composite has gold nanoparticles dispersed in poly(methylmethacrylate). The method can be carried out while moving the substrate relative to the laser beam during the period of irradiation. A fluid can be passed over one or more surfaces of the substrate during the irradiation.

The method can be carried out on a coated substrate where the coating is a polymer or a second metal nanoparticle/polymer composite is placed on the substrate before irradiation with the laser. The coating can be the same polymer in the composite without any dispersed metal nanoparticles. Alternately some metal nanoparticles can be included in the coating defining a second metal nanoparticle/polymer composite where the concentration of the second metal particles in the coating is lower than the concentration of metal nanoparticles in the substrate. The second metal composite can have a different metal as compared to the metal in the substrate. The coating can be formed by depositing a solution of the coating material on the article and fixing the coating on the article by evaporation of the solvent. Deposition methods include casting, spraying or dipping.

The substrate can include a plurality of laminated layers where the individual layers can be polymer layers or metal nanoparticle/polymer composite layers. The polymers in the various polymer and composite layers can be the same polymer structure or can be different polymers. The metal nanoparticle/polymer composite layers can have the same or different metal nanoparticles and the concentration of the nanoparticles can be the same or different. In this way the different layers can be individually addressed by the laser to form microchannels in different layers by selectively activating nanoparticles in different layers of the laminate article.

Another embodiment of a method using a metal nanoparticle/polymer composite involves joining or sealing pieces of materials where a metal nanoparticle/polymer composite composition with metal nanoparticles dispersed in a polymer containing matrix is applied to one or more pieces of material to be joined or sealed upon irradiation of the metal nanoparticle/polymer composite composition with a laser beam to induce a transformation of the composition. The composition can be formed by adding metal nanoparticles to a polymer containing solution and drying the solution. The composition can have the form of a film, fibers, or particles. When one of the pieces is the composition containing the metal nanoparticle/polymer, irradiation can be directed to the interfaces of the composition and the other pieces to join the pieces together. When the pieces and composition are of miscible polymers a mixing of the interface of the pieces and the composite can occur upon irradiation to melt the interface and fusion upon cooling to solidify the mixed interface. The polymer containing composition can be a resin with functional groups that undergo addition reactions when thermally activated upon laser irradiation. The functional groups can be on the polymer or can be included in the composition as separate monofunctional, bifunctional, or polyfunctional compounds in addition to the polymer. A thermal initiator for the addition reactions can be included in the composition.

An article comprises at least one substrate, the substrate comprising a plurality of metal nanoparticles dispersed in a polymer comprising matrix. At least one closed microchannel is formed in the substrate. The metal nanoparticles can comprise gold and the polymer comprise poly(methylmethacrylate). The metal nanoparticles can comprise 0.2 to 10 weight percent of the substrate. The substrate can be a thin film. The at least one substrate can comprise a plurality of substrates stacked on one another to form the article, wherein the metal nanoparticles vary in composition across the plurality of substrates.

BRIEF DESCRIPTION OF THE DRAWINGS

A fuller understanding of the present invention and the features and benefits thereof will be obtained upon review of the following detailed description together with the accompanying drawings, in which.

DETAILED DESCRIPTION

Figure 1:
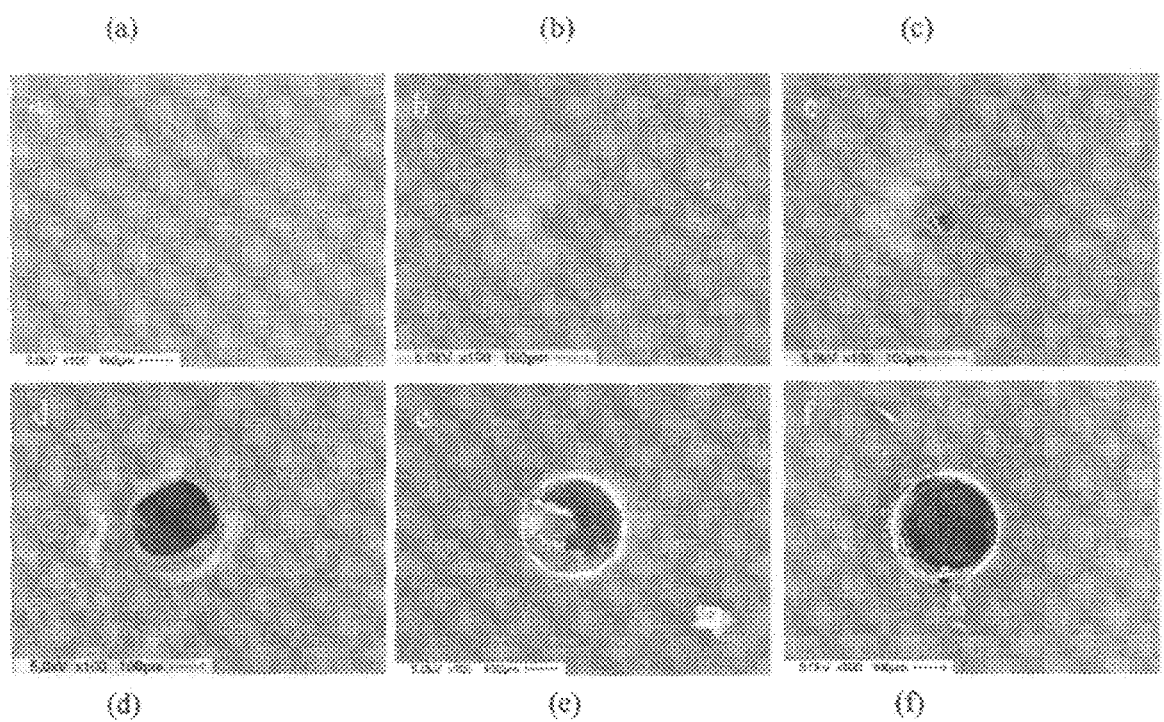
FIGS. 1(a)-(f) shows scanned SEM images of gold nanoparticle-embedded poly(methyl methacrylate (PMMA) composite samples irradiated by a continuous wave Nd:YAG laser (532 nm) for 2 min, with the control sample image (no metal nanoparticles added to the polymer) shown in FIG. 1(a). With an increased concentration of nanoparticles in the composite film, the surface features progress from a bump to increasingly larger holes (FIG. 1(b)-(f).

In a first embodiment of the invention, the laser processing involves a direct laser writing technique to fabricate closed micro tunnels and reservoirs in a substrate material comprising a metal nanoparticle/polymer composite by utilizing the photon-thermal energy conversion property of the metal nanoparticles to promote chemical and/or physical state changes to remove material from specific locations on or within the composite material is described. This embodiment involves the decomposition of the composite in the vicinity of the volume containing metal nanoparticles that is irradiated by the laser beam. In a second embodiment of the invention, the photon-thermal energy conversion properties is used to promote chemical and/or physical state changes to deliver and/or fix material in a specific location on, within, or in the vicinity of the composite material. This embodiment can involve a change in physical state such as melting, wherein the melted composite can be used to wet and join pieces of material upon solidification where the polymers in the composite and the materials are generally identical or miscible. This embodiment can also involve the formation of bonds between a plurality of molecules. The chemical process can range from a cross-linking of the polymer in the metal nanoparticle/polymer composite or the initiation of at least one monomer dispersed with or within the composite. The monomers can be monofunctional or polyfunctional or mixtures thereof and can have various molecular weights. Although these embodiments are generally described herein relative to gold nanoparticles, other metal nanoparticles can be used with the invention, such as Ag or Ni, generally being optimized using a different wavelength of radiation as compared to gold nanoparticles. Nanoparticles are generally 1 to 999 nm in size and can be of various shapes.

In one embodiment, a method of forming an article having closed microchannels comprises the steps of dissolving a polymer in a solvent to form a solution, adding a plurality of metal nanoparticles to the solution, and removing solvent to form a thin film comprising a metal nanoparticle/polymer composite. As defined herein, a thin film refers to a film having a thickness less than 10 μm. The thin film is laser irradiated at a sufficient high intensity and sufficiently long period of time to locally remove (e.g. decompose) the polymer and form channels in the film but at a sufficiently low intensity and sufficiently short period of time to preserve polymer at a surface or surfaces of the film. In this manner enclosed microchannels are formed. As used herein, the term "closed channels" as in closed microchannels" refers to open volume portions (voids) in the substrate bounded on all sides (top, bottom and sides) extending not necessarily linearly for a given length. The closed channels generally includes surface contacts on the ends to allow fluids to be introduced and be removed from the surface.

These closed microchannels formed by the direct laser writing process according to the invention differs significantly from conventional laser ablation processing of polymer materials, whereas only open channels (or troughs) and holes are formed. The nanoparticle/polymer composites can be fabricated in the form of thin films, microspheres, wires or micro- or nanotubes. Alternatively, multiple-layered films can be prepared using a different nanoparticle/polymer composite material or a pure polymer material in addition to the first nanoparticle/polymer composite material. The different nanoparticle/polymer composite materials can have different metal concentrations, different metals, and/or different polymers. Although not necessary in all embodiments of the invention, when different polymers are used, they are typically well adhered at their interface. The use of an adhesive compound can be present at the interface of the materials or with equivalent or similar materials cohesion between the two surfaces can be exploited to join the interface. In some embodiments this interface can be mechanically locked by any known method including clamps and bolts rather than adhered.

Figure 4:
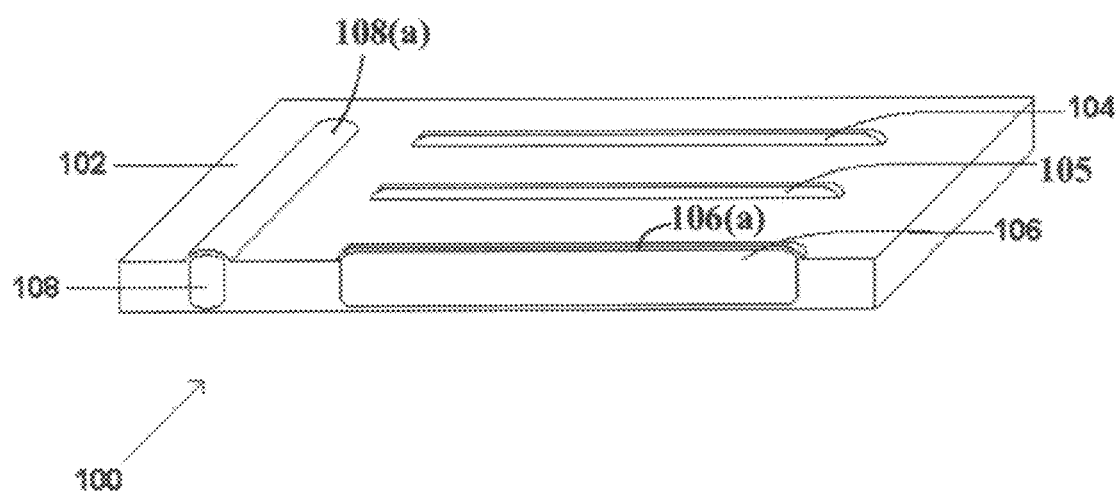
FIG. 4 shows a cross sectional view of an article according to the invention comprising a plurality of closed microchannels formed in a composite substrate.

In some embodiments of the invention the method further comprises the step of translating the substrate relative to a fixed laser under irradiation to form a desired pattern at a desired speed in the nanoparticle/polymer composite film, the translation process preferably being computer controlled. FIG. 4 shows a cross sectional view of an article 100 according to the invention comprising a plurality of microchannels 104, 105, 106 and 108 formed in a composite substrate 102. Microchannel 106 lies perpendicular to a cut surface to expose cross-section of the microchannel showing a top of the microchannel 106(a) that is covered with the composite. Microchannel 108 has been cut along its length to expose the length of the channel showing the covered top of the microchannel 108(a) through an exaggerated elevated representation. When the substrate comprises multiple films of different nanoparticle/polymer composite materials (not shown), multiple translations of the multi-film substrate can be carried out with different wavelengths of laser light and different intensities and periods of illumination of a given volume. Although described above as the translation of a substrate film under a fixed laser source with a fixed orientation of the laser beam from the source, the film can be fixed and the laser translated relative to the film, the film can be fixed and the laser source fixed with the orientation of the beam altered to proceed along a desired portion of the film, or any combination of fixed and translating laser source, beam orientation, and film can be employed to form the desired pattern of microfeatures in the film.

In another embodiment of the invention, the substrate includes a second capping film or coating of a nanoparticle/polymer composite that is deficient in nanoparticles relative to the base nanoparticle/polymer composite, or a polymer film free of nanoparticles which is adhered or cohered to the base nanoparticle/polymer composite film or article before the irradiating step. In this embodiment, the decomposition of this capping film is inhibited relative to the base composite film as the capping film has little or no metal nanoparticles included for the generation of heat.

The laser source is selected to provide irradiation at a wavelength in which the metal nanoparticles provide efficient absorption. For spherical Au nanoparticles, 532 nm radiation (green light) provided by a Nd:YAG laser has been found to be efficiently coupled. The invention is not limited to visible light sources, since certain metal nanoparticles provide strong absorption outside the visible spectrum, such as in the ultraviolet range.

The polymer of the composite is selected to absorb little if any of the radiant energy from the laser beam. As a result, the composite only decomposes in the vicinity of the irradiated volume, provide the irradiated volume has a sufficient concentration of metal nanoparticles.

Laser writing according to the invention is a convenient and highly versatile method to create microtunnels and reservoirs in polymer composite comprising substrates using a simple direct laser writing process. A significant advantage of this method compared to other existing laser writing techniques is the ability to write patterns and features selectively on a specific layer of a multilayer film while keeping other layers of the film intact or with little decomposition. This permits undercutting to be performed to fabricate three-dimensional layered devices without multiple-step sample processing as involved in typical photolithography. For example, by using nanoparticles that absorb light in different spectral region, one can prepare a multilayer composite film and use laser beams of different wavelengths to create patterns in different layers. This capability can be exploited for the development of complicated lab-on-chip devices to perform complex functions.

Although not necessary to practice the present invention, the Inventor not seeking to being bound to any particular mechanism, provide the following mechanism believed to be operable. Irradiating a metal (e.g. gold) nanoparticle/polymer composite material using a laser beam operable at a strong absorption wavelength (e.g. 532 nm for gold) typically in a power range 10-100 mW (for a 250 micron beam diameter), or at a lower intensity, converts the photon energy absorbed by the metal nanoparticle into thermal energy which heats the surrounding polymer matrix. The heating causes the melting/softening of the polymer or its decomposition depending on the temperature achieved. The temperature achieved depends on the intensity of the radiation and the period of time that radiation is maintained on a particular volume of the composite. For example, a composite of 10 nm gold nanoparticles dispersed in poly(methylmethacrylate) (PMMA) softens and subsequently melts as the temperature approaches and exceeds the melting temperature of PMMA which is around 177° C., followed by decomposition when the temperature reaches the reported decomposition temperature of about 230 to about 280° C. Decomposition is an endothermic process in which sufficient energy must be provided to cause bond cleavage of a sufficient number of bonds in the polymer backbone. Irradiation of a 1.5 weight percent gold nanoparticles in PMMA film using a 50 mW 300 micron spot size laser beam causes the melting of the composite as was evident to the naked eye within a few seconds. Using this technique, small holes or patterned lines in a nanoparticle/polymer composite film were created.

In other embodiments a nanoparticle/polymer composite material is formed by mixing metal nanoparticles into a polymer, a polymer precursor, such as a polymer containing reactive functionality, and/or a monofunctional and/or polyfunctional monomer in solution which becomes the composite matrix after removal of the solvent. In one embodiment the solvent can be the monomer and the monomer is only partially removed to form the composite that can be cored. In other embodiments the composite can be formed by mixing the heated components where the composite solidifies upon cooling. The functionality can be of a single type or of two different complementary types that undergo addition. The addition can be between a pair of complementary functionality, or can be functionality that will undergo addition to a growing polymer chain. The weight ratio of nanoparticles incorporated into the composite can be anywhere between 0.01 Wt. % to 99%, and is generally from 0.2 to 10 Wt. % of the composite. Composite materials in the form of thin films, fibers, particles, or gels can be made out of the mixed solution. When the composite includes a polymer precursor, exclusively or with a polymer, the composite can be used as a photo-curing resin where the thermally induced reaction between functionality in the composite results in polymerization and solidification. In this manner, many thermally initiated reactions can be used in curing systems that are photochemically induced. Thermal initiators such as AIBN or peroxides can be included in systems that cure via radical chain processes such as polymerizations of vinyl monomers. The inventive method enhances the scope of reactions that can be used for photo-curing.

Another embodiment of the method permits welding composite pieces by irradiating the interface of composite pieces specifically at the interface where the heating, melting and intermixing occurs only at the interface irradiated with a laser beam. Two pieces of materials can be soldered together by placing a film of the metal nanoparticle/polymer composite between the two pieces. Upon irradiation of the composite by the laser, the composite can melt and wet the pieces to be joined which is then fixed upon cooling of the composite after removal of the laser beam. The pieces need not be composite pieces but in general have some miscibility with the polymer of the composite such that the composite wets the pieces well and adheres upon cooling. Alternately, the pieces can be immiscible with the composite but contain functionality that undergo addition with the photochemically induced curing resins described above. When the pieces have some porosity at the surfaces to be joined, the composite can flow into the pores upon melting and mechanically lock the pieces together upon solidification even when the pieces and composite display little or no miscibility.

Based on this phenomenon of photon to thermal energy conversion occurring specifically in a volume address by a laser beam, many applications can be developed from this metal nanoparticle/polymer composite material system. The following is a partial list of some of the potential applications:

Use as Sealants, Adhesives and Fillers

Gold or other metal nanoparticles can be mixed with thermal curable epoxy resin (monomer). A traditional two part curing system can be formulated as one part where a first part is included in the metal nanoparticle/polymer composite and a suspension of the composite in the complementary second part permits curing to occur only when the first part is released from the melted composite upon irradiation. The first or second part can be a reagent or a catalyst. After applying the resin to a site that needs to be sealed or glued, a laser pointer or other light source can be used to induce curing of the resin. The composites materials can also be applied as a solid in the form of a films, fibers, or particles into the place that needs the sealants or adhesives. A simple laser pointer irradiation can introduce the melting of the material and once the material has cooled, sealing or adhesive bonding is completely achieved. When biocompatible polymers and nanoparticles are used to develop the composite material, these materials can be used as medical glues, sealants or fillers for surgery, wound healing and dental reparation/restoration applications.

Use as Electronic Packaging Materials

Polymers are essential components in current generation electronic packaging. The role of polymers as electronic packaging materials include high density printed wiring boards, ultra-low dielectric constant dielectrics, integral passives (capacitors, resistors, inductors), flip-chip solder joints and alternative conductor adhesives, underfills, electrically and thermally conductive heat-transfer materials. The nanoparticle/polymer composite materials according to the invention may be used for electronic packaging applications. One embodiment of the invention is a nanocomposite/plastic composite solder where electronic components can be soldered by laser irradiation. Another embodiment is directed to a nanocomposite material of an electrically conducting material comprising an electrically conductive polymer(s) or non-conducting polymer(s) with electrically conductive particles as fillers. Another embodiment is a nanoparticle/polymer composite film to make flexible printed circuit boards for flexible electronic devices. The formation of holes into and through the circuit board can be made by low power laser drilling. The use of an ultra-low power laser to introduce the melting of nanocomposite materials provides a reliable, reproducible, and flexible method for the handling, deposition, and shaping of electronic packaging. Common production losses from errors, defects, and failure of mechanical equipment, such as drill bits, can be avoided by the practice of the present invention where precise nearly defect free holes can be made by the selective decomposition of the material by this embodiment of the invention. The thermal, electrical, mechanical and other properties afforded by the metal nanoparticle/polymer composites of this embodiment of the invention can be readily matched to and optimized for a given packaging application as a wide variety of polymers can be used as the matrix of the composite.

Use as Substrates for Micro-patterning

Micro-patterned substrates have numerous applications in electronics and various devices. An embodiment of the invention is the creation of micro- and nanoscale patterns within the metal nanoparticle/polymer substrate where closed micro-tunnels and micro reservoirs can be formed by the laser-induced melting and/or ablation of the metal nanoparticle/polymer substrate. In this manner a pattern of interconnecting or isolated voids can be formed by the methods of the invention which can subsequently filled with various materials for the formation of a multilayer device. The method of the invention can be cost effective relative to other state of the art techniques. For example, most lithographic techniques for the formation of features in multiple layers of a device involve numerous sequential processing steps that need to be repeated for each layer of a device. The method of the invention can allow the feature formation in significantly fewer steps. Features in different layers can be formed simultaneously by the use of multiple laser beams at different wave lengths matched to the metals incorporated into a given layer of the device.

EXAMPLES

It should be understood that the Examples described below are provided for illustrative purposes only and do not in any way define the scope of the invention.

Example 1

Film preparation: A 30 weight percent solution of poly (methyl methacrylate) (PMMA) solution was prepared by dissolving PMMA powder (average molecular weight of 120, 000 g/mol) in tetrahydrofuran (THF). Gold nanoparticles with an average diameter of about 10 nm were synthesized according to a literature procedure. Varying amounts of nanoparticles were separately dissolved in THF to yield solutions that when mixed with the PMMA solutions 0.2 to 1.5 weight percent loading of nanoparticles in PMMA resulted after the removal of the THF from the mixture. After adding the gold nanoparticle solution to PMMA solution, mixing was carried out by sonication for 5 min resulting is a homogeneous dispersion. The PMMA/gold nanoparticle solutions were cast with 50 mils thickness on glass substrates using a drawdown bar (Paul N. Gardner Company, Inc). Films with an approximate thickness of 250 µm were obtained after drying overnight under ambient conditions (normal room temperatures and pressure). A double layer film was prepared by depositing a 30 weight percent nanoparticle free PMMA solution on the top of a dried PMMA/gold nanoparticle film, spread using a drawdown bar to give an 8 mils thick PMMA layer on a PMMA/gold nanoparticle layer after drying overnight at ambient conditions.

Example 2

Laser irradiation: A continuous wave Nd:YAG laser with a beam size of 0.3 mm (Crystalaser LC) was used to irradiate the films to create various features. The output power of the laser was adjustable from 8.5 mW to 100 mW. Micro-holes were formed by directly irradiating the film surface for a sufficient period of time with a stationary beam on a stationary film. Microtunnels were created by moving the film linearly at a constant velocity under irradiation with a stationary laser at an output power of 30 or 50 mW. The linear movement of the film was controlled by an automatic stage of a syringe pump (Kd Scientific) with a speed of about 300 um/min.

Example 3

Scanning Electron Microscopy (SEM): The processed metal nanoparticle/polymer composite specimens were analyzed by a JOEL 6400 SEM at an accelerating voltage of 5 kV. The specimens were coated with a Pd film by an Emitech Magnetron Sputter Coater before imaging to avoid electrical charge build-up.

Example 4

FIG. 1(a)-(f) are scanned SEM images of metal nanoparticle/polymer composite substrates irradiated for 2 min. The nanoparticle free polymer (control sample) displayed no observable morphological change after laser irradiation (FIG. 1(a)). With a 0.2 weight percent loading of gold nanoparticles in the polymer, a small bump appeared on the surface of the composite film (FIG. 1(b)). The dimension of the bump was about 300 μm, which was approximately equivalent to the laser beam spot size. As the concentration of gold nanoparticles in the composite film increased for the samples with 0.5, 0.7, 1.0 and 1.5 weight percent nanoparticles, progressively larger holes appeared following equivalent laser irradiation conditions for the composite films (FIGS. 1(c)-(f), respectively). The 1.5 weight percent gold nanoparticle composite displayed a hole after 2 seconds of irradiation that was equal in dimensions to that irradiated for 2 minutes.

Although not necessary to practice the present invention, the inventors not seeking to be bound by a mechanism, provide the following mechanistic model for the generation of the features in the metal nanoparticle/polymer composite. The bumps and holes are caused by the decomposition of the polymer through a photon-thermal energy conversion process. Polymers such as PMMA are generally known to be poor thermal conductors. After absorbing the photon energy from the laser, the gold nanoparticles produce a large amount of heat which results in a rapid temperature increase around the nanoparticles. When a sufficiently high temperature is achieved, complete decomposition of the immediate surrounding PMMA polymer results with the generation of a gas with an accompanying increase in the local internal pressure within the composite film. A TGA analysis of the nanoparticle/PMMA composite materials showed that decomposition occurs at about 280° C. Hence, it is believed that the temperature around the laser addressed nanoparticles increased to or exceeded about 280° C. This temperature achieved in the volume irradiated by the laser in a time period inversely proportional to the concentration of the nanoparticles. By controlling the energy of the laser and the duration of irradiation, it is possible to create microtunnels and reservoirs in metal nanoparticle/polymer composite films using a one-step direct laser writing technique.

Figure 2:
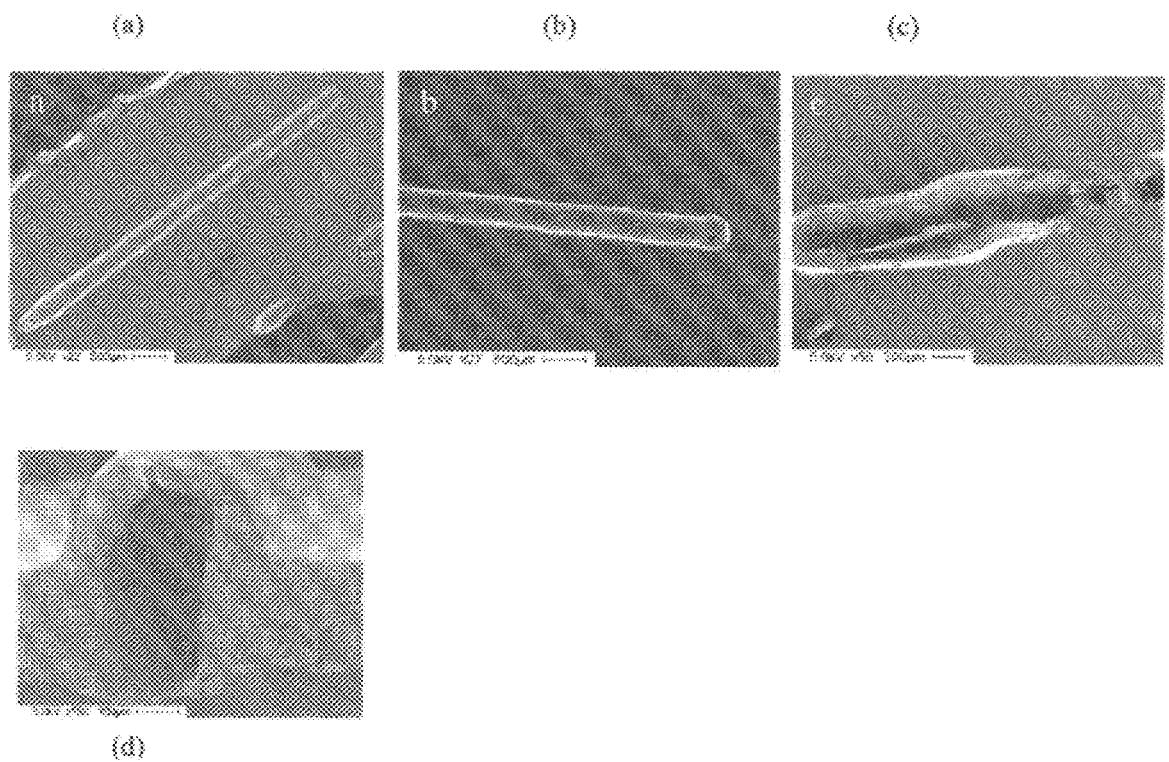
FIGS. 2 (a)-(d) show scanned SEM images of the irradiated films with laser power set at 30 mW. Sealed micro tunnels with a width around 300 μm are shown in FIG. 2(a). With excessive energy or duration of irradiation, the upper wall of the tunnels display ablation or cracking of the material (FIG. 2(b)). The smooth internal surface of a tunnel is shown for a tunnel after removal of the upper wall (FIG. 2(c)). A microchannel cut to expose a cross section shows that the micro tunnel is sealed (FIG. 2(d)).

In a follow up experiment, using the automatic stage of a syringe pump to control the movement of nanocomposite film samples, one-dimensional microtunnels within the films were fabricated using laser irradiation. FIG. 2(a)-(d) are scanned SEM images of irradiated films with a laser power set at 30 mW. At appropriate irradiation conditions, sealed microtunnels with a width around 300 μm were obtained (FIG. 2(a)). Again, this width corresponds approximately to the size of the laser beam. When irradiation energy or the duration exceeds the window about the optimum condition, the upper wall of the microtunnels is damaged with cracking and ablation of the composite material (FIG. 2(b)). After mechanically removing part of the upper wall of the tunnels, the internal surface of the tunnels was observed to be smooth (FIG. 2(c)). FIG. 2(d) shows a scanned image of a cross section cut mechanically in a laser processed metal nanoparticle/polymer composite film that clearly shows the sealed nature of the microtunnel formed when the laser processing is carried out at near optimal conditions. Analysis of the mechanically cut cross section shows that the thickness of the upper wall is less than or around one micron.

As noted above, the direct laser writing process according to the invention differs significantly from conventional laser ablation processing of polymer materials where only open channels and holes (no tops) are formed. It appears that tunnels form rather than open channels because at the surface of the composite film, the heat generated by the nanoparticles in the polymer matrix is sufficiently dissipated to the contacting air. This relatively efficient heat dissipation was observed to occur only to a short depth from the surface of the film, only a few microns, due to the poor thermal conductivity of the PMMA used. Because of the heat dissipation to the air, the surface layer of the polymer film is not decomposed permitting the microtunnel shown to be formed.

It was observed that the upper wall of the microtunnels can be susceptible to cracking if an overdose of laser irradiation. The irradiated metal nanoparticle/polymer composite article can have a fluid passing over the irradiated surface or multiple surfaces to suppress thermal decomposition of the composite at the surface and enhance the time window of irradiation for any given irradiation power. The fluid can be a gas or a liquid and can be chilled before flowing over the surface of the composite. One or more surfaces of the composite article can be in contact with a solid material that can readily absorb heat from the composite by any known physical or chemical phenomena. A two-layer film can be fabricated to enhance the thickness of the upper wall of the microtunnels. The bottom layer is a metal nanoparticle/polymer composite and the top layer is made from a similar composite to the substrate composite but having a significantly lower concentration of metal nanoparticles. The top layer can be the pure polymer. In this manner the photon-thermal energy conversion and accompanying polymer decomposition occurs predominately or exclusively in the lower composite film layer, while the upper remains intact during the laser writing process. Where two composite layers are used, the metals can differ in the two layers. multiple layers can be used where the presence or absence of metals, the choice of metal, and the type of metal can be varied to achieve the selective degradability of the composite layers.

Figure 3:
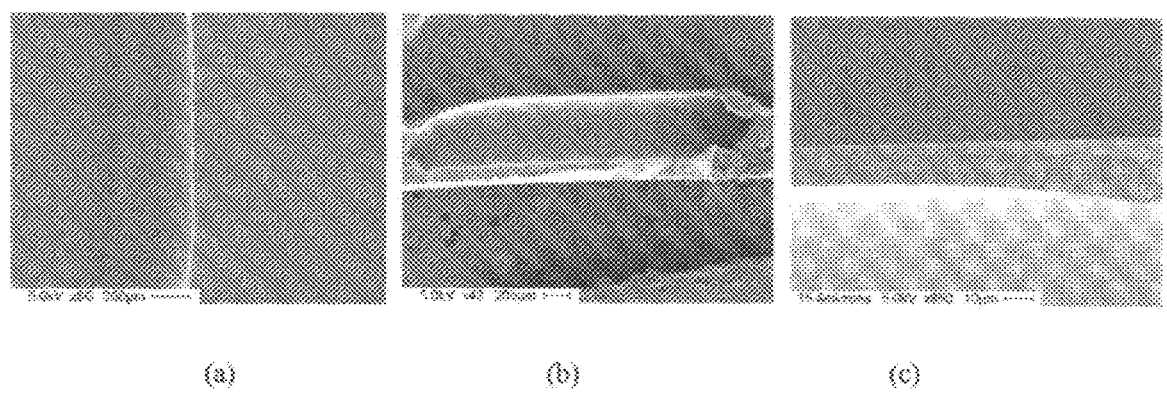
FIG. 3 (a)-(c) shows scanned SEM images of laser irradiated double layer films. The double layer films have a pure PMMA layer on top of a gold nanoparticle/PMMA composite layer.

An experiment was performed on double layer films. Following laser writing of the double-layer film, more robust and intact microtunnels were obtained (FIG. 3(a)). A closer examination of tunnels that were mechanically broken for inspection revealed a very smooth inner surface of the tunnel and a much thicker upper wall of around 15 μm (FIGS. 3(b) and (c)).

This invention can be embodied in other forms without departing from the spirit or essential attributes thereof and, accordingly, reference should be had to the following claims rather than the foregoing specification as indicating the scope of the invention.

We claim:

1. A method of forming an article having at least one closed microchannel, the method comprising the steps of:
   providing a substrate comprising a solid composite material, said composite comprising metal nanoparticles dispersed in a polymer comprising matrix;
   irradiating said substrate with a laser beam at an intensity and for a time sufficient to selectively remove said polymer below a surface of said substrate to form at least one closed microchannel, wherein said intensity and said time are low enough so as not to remove polymer of said matrix above said microchannel; and
   forming surface contacts on respective ends of said microchannel that allow fluids to be introduced and removed from said microchannel.

2. The method of claim 1, wherein said step of providing said substrate comprises the steps of:
   dissolving a polymer in a solvent to form a solution;
   adding a plurality of metal nanoparticles to said solution; and drying said solution to form said substrate.

3. The method of claim 1, wherein said metal nanoparticles provide at least one strong absorption wavelength, and wherein a wavelength of said laser beam is at said strong absorption wavelength.

4. The method of claim 1, wherein said metal nanoparticles comprise gold nanoparticles, and wherein said polymer comprises poly(methylmethacrylate).

5. The method of claim 1, further comprising then step of:
placing a coating on said substrate before said irradiating step, wherein said coating comprises a second polymer, second metal nanoparticles, or a second metal nanoparticle/polymer composite.

6. The method of claim 5, wherein a concentration of said second metal nanoparticles in said coating is lower than a concentration of said metal nanoparticles in said substrate.

7. The method of claim 5, wherein said second metal nanoparticles comprise a different metal composition than the composition of said metal nanoparticles in said substrate.

8. The method of claim 5, wherein said step of placing comprises:
depositing a solution of said coating dissolved in solvent; and
evaporating said solvent.

9. The method of claim 1, wherein said polymer has a decomposition temperature, and wherein a temperature reached during said irradiating is above said decomposition temperature to induce removal of said polymer.

10. The method of claim 1, wherein said substrate comprises a plurality of laminated layers.

* * * * *

UNITED STATES PATENT AND TRADEMARK OFFICE
CERTIFICATE OF CORRECTION

| | |
|---|---|
| PATENT NO. | : 8,226,878 B2 |
| APPLICATION NO. | : 11/774796 |
| DATED | : July 24, 2012 |
| INVENTOR(S) | : Qun Huo and Hui Chen |

It is certified that error appears in the above-identified patent and that said Letters Patent is hereby corrected as shown below:

In the specification

Please correct column 1, lines 12-17, "Statement Regarding Federally Sponsored Research or Development" should read as follows:

Statement Regarding Federally Sponsored Research

This invention was made with Government support under agency contract/grant nos. 0552295, DMR 0239424 and DMI 0506531 awarded by the National Science Foundation. The Government has certain rights in this invention.

Signed and Sealed this
Twenty-sixth Day of April, 2016

Michelle K. Lee
*Director of the United States Patent and Trademark Office*